(12) United States Patent
Eisenhower et al.

(10) Patent No.: US 8,840,340 B2
(45) Date of Patent: Sep. 23, 2014

(54) DEPLOYING SENSOR ARRAYS

(75) Inventors: Frank L. Eisenhower, Guildford (GB);
Richard Edward Luff, Guildford (GB);
Peter Hadfield, Knaphill (GB); Ike Greenberg, Knaphill (GB); Michael Henshaw, Newport (GB); John Churchill, Newport (GB)

(73) Assignee: TGS Geophysical Company (UK) Limited, Godalming, Surrey (GB)

( * ) Notice: Subject to any disclaimer, the term of this patent is extended or adjusted under 35 U.S.C. 154(b) by 135 days.

(21) Appl. No.: 13/376,045

(22) PCT Filed: May 28, 2010

(86) PCT No.: PCT/GB2010/001065
§ 371 (c)(1),
(2), (4) Date: Feb. 16, 2012

(87) PCT Pub. No.: WO2010/139940
PCT Pub. Date: Dec. 9, 2010

(65) Prior Publication Data
US 2012/0134752 A1    May 31, 2012

(30) Foreign Application Priority Data

Jun. 5, 2009 (GB) .................................. 0909759.3

(51) Int. Cl.
| | | |
|---|---|---|
| *F16L 1/16* | (2006.01) | |
| *G01V 1/00* | (2006.01) | |
| *H02G 1/10* | (2006.01) | |
| *G01V 1/18* | (2006.01) | |
| *G01V 1/20* | (2006.01) | |
| *G01V 1/38* | (2006.01) | |
| *H02G 9/02* | (2006.01) | |

(52) U.S. Cl.
CPC .. *H02G 1/10* (2013.01); *H02G 9/02* (2013.01); *G01V 1/18* (2013.01); *G01V 1/20* (2013.01); *G01V 1/3843* (2013.01)
USPC .......... 405/166; 405/158; 405/174; 405/190; 367/15; 367/16; 367/56; 367/154; 367/188

(58) Field of Classification Search
CPC  G01V 1/16; G01V 1/3852; G01V 2210/1427
USPC ......... 405/158, 159, 164, 166, 174, 180, 190, 405/191; 367/154, 188, 15, 16, 56, 173, 367/177
See application file for complete search history.

(56) References Cited

U.S. PATENT DOCUMENTS

| | | | |
|---|---|---|---|
| 3,993,859 A * | 11/1976 | McNeel ........................ | 174/565 |
| 5,339,281 A | 8/1994 | Narendra et al. | |
| 6,474,254 B1 * | 11/2002 | Ambs et al. .................... | 114/312 |
| 6,588,980 B2 * | 7/2003 | Worman et al. ............... | 405/158 |
| 6,657,921 B1 * | 12/2003 | Ambs ............................. | 367/20 |
| 8,149,647 B2 * | 4/2012 | Borgen et al. .................. | 367/20 |
| 2005/0155814 A1 | 7/2005 | Bath et al. | |
| 2006/0227656 A1 * | 10/2006 | Berg et al. ...................... | 367/15 |

FOREIGN PATENT DOCUMENTS

| | | |
|---|---|---|
| FR | 2785685 | 5/2000 |
| GB | 2350679 | 12/2000 |
| GB | 2392245 | 2/2004 |
| GB | 2437406 | 10/2007 |
| WO | 2005010316 | 2/2005 |
| WO | 2009026002 | 2/2009 |

OTHER PUBLICATIONS

International Searching Authority, "International Search Report", "Received Dec. 1, 2011", Mailed Nov. 11, 2011, Published in: WO.

* cited by examiner

*Primary Examiner* — John Kreck
*Assistant Examiner* — Carib Oquendo
(74) *Attorney, Agent, or Firm* — Fogg & Powers LLC

(57) ABSTRACT

There is described an apparatus and method for deploying a sensor array comprising a plurality of sensors (5) joined together by connection cables (6) in one or more "chains", and connected to an input/output device (8). An input/output connection unit (7, 15) is provided on a carrier (10), and the sensors are held on or in deployment devices (14a-14e) mounted to the carrier with their connection cables (6) connected to the input/output connection unit (7, 15). The input/output device (8) may also be mounted to the carrier, and connected to the connection unit (7, 15). The carrier (10), sensors, and input/output device (8) may be delivered as a single package to the area where the sensor array is to be deployed. The sensors are then moved from the carrier to their final positions. The deployment devices (14a-14e) may be detached from the carrier and moved sequentially to the sensor positions, and a sensor may be removed from the deployment device at each sensor position.

21 Claims, 15 Drawing Sheets

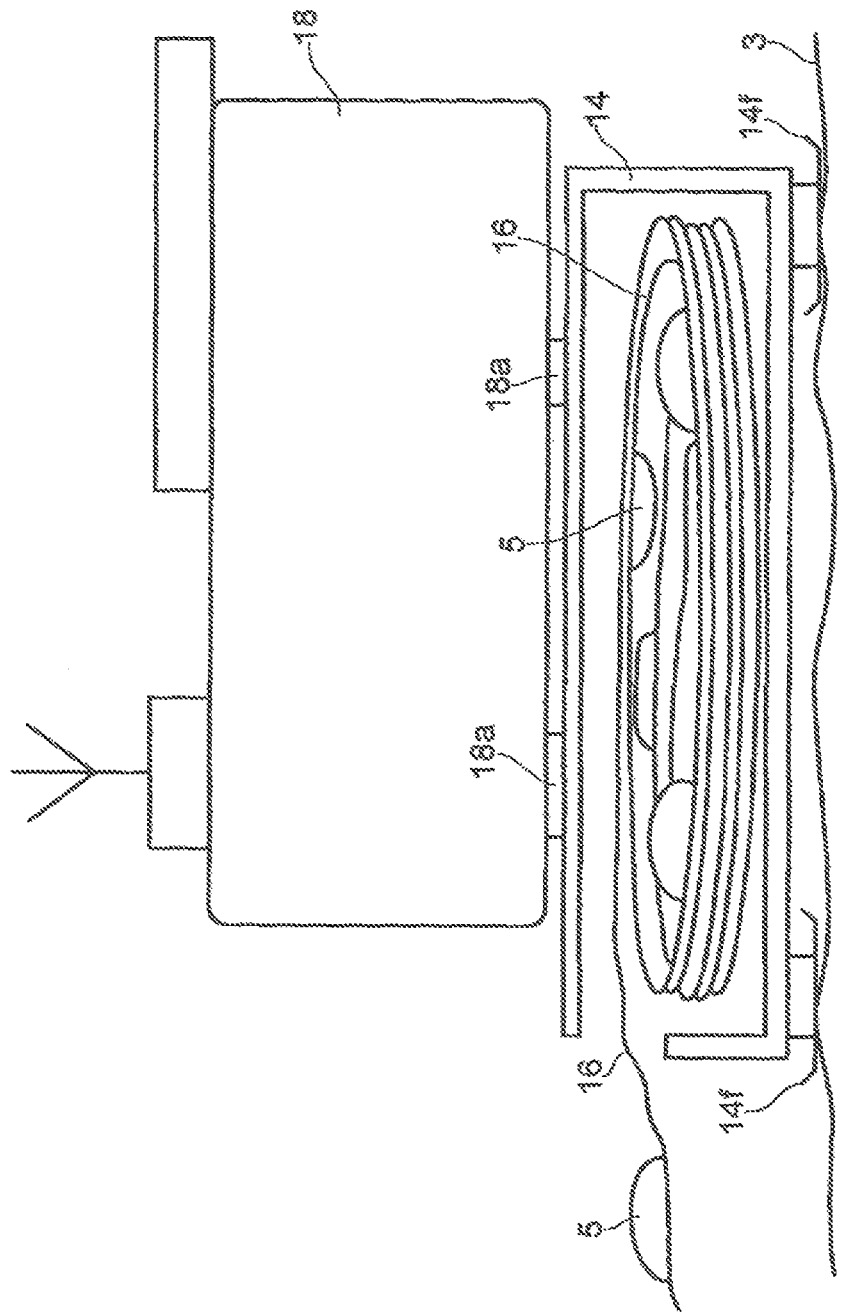

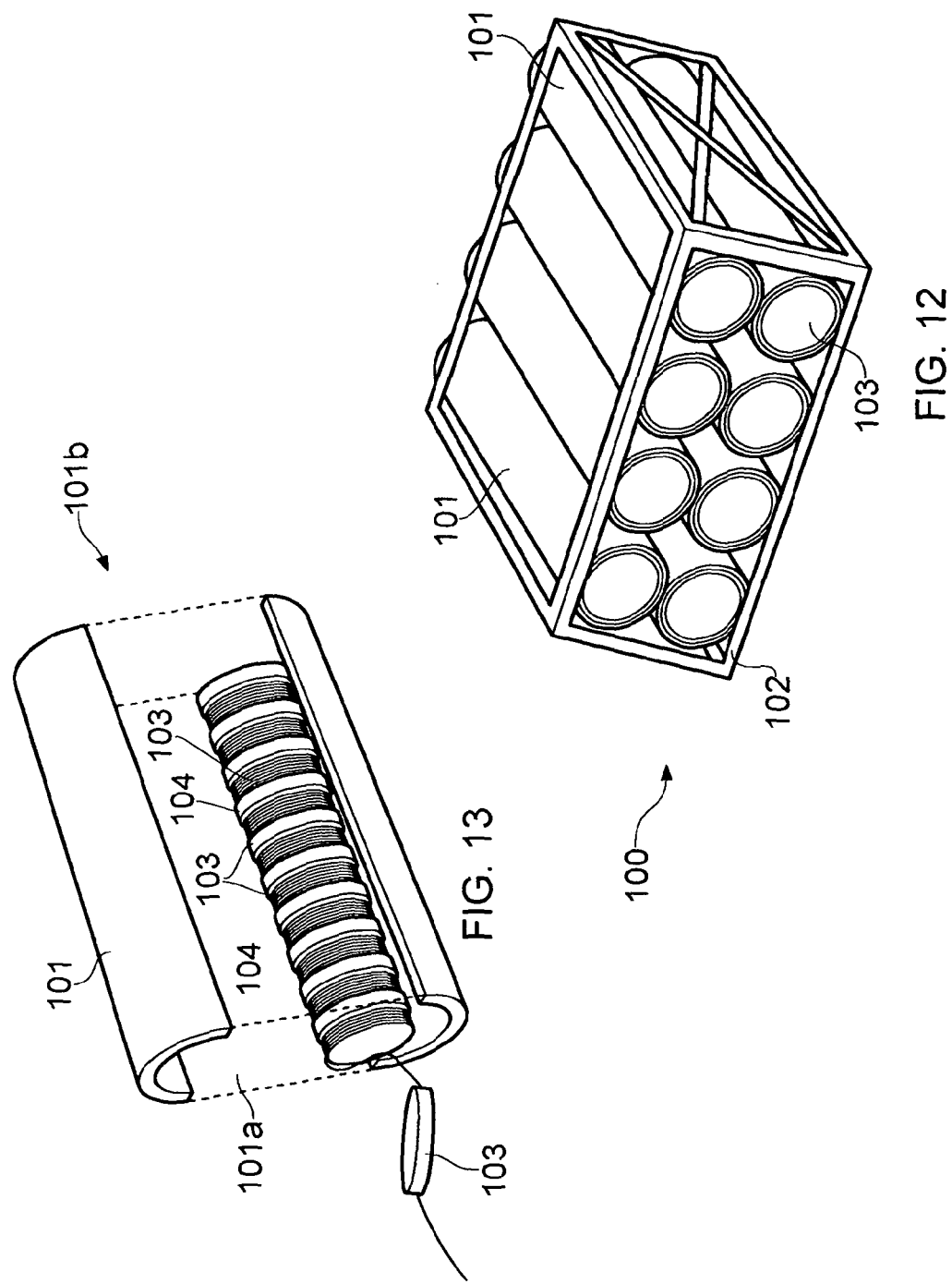

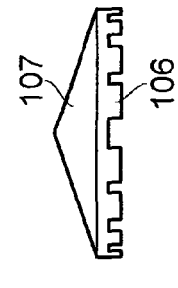
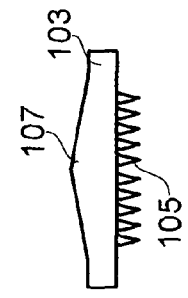
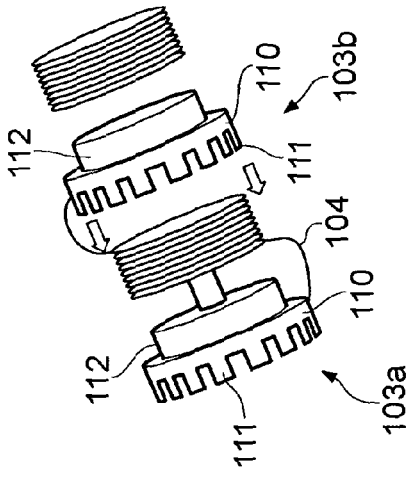
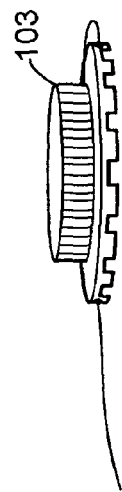
FIG. 14
FIG. 15
FIG. 16
FIG. 17
FIG. 18

DEPLOYING SENSOR ARRAYS

This application claims priority to International Patent Application No. PCT/GB2010/001065 filed on 28 May 2010, which claims proiority to GB Patent Application No. 0909759.3, filed on 5 June 2009.

The present invention relates to methods of deploying sensor arrays, and is particularly concerned with methods and apparatus for deploying sensor arrays in environments which are difficult of access. Most particularly, the present invention finds utility in the deployment of undersea seismic sensor arrays. It is to be understood, however, that the method and apparatus may be adapted to the installation of sensor arrays of all types.

Undersea seismic sensor arrays are widely used in the exploration of and monitoring of oil reservoirs beneath the seabed. In these seismic monitoring techniques, an array of accelerometers and/or hydrophones are deployed as sensor packages on the seabed and used to detect reflected seismic waves, and the results are analysed to provide information relating to the nature and state of geological structures beneath the seabed.

The array of seismic sensors is conventionally composed of a number of lines of sensors, each line of sensors being a stout seabed cable, along which seismic sensor packages are attached at intervals. The seismic array may extend over many square kilometres, and conventionally comprises a number of parallel seismic cables with their respective seismic sensor packages, and a "backbone" cable extending perpendicularly to the seismic cables and joining them together. Signals are sent to the sensor array, and received from the sensor array, via the backbone cable.

The seismic sensor array is deployed by feeding the seismic cables over the side of a ship sequentially, to lay them in parallel lines on the seabed. This is usually done by attaching an anchor to one end of the seismic cable, lowering the anchor to the seabed at a predetermined position, and paying the seismic cable and sensors over the side of the ship as the ship sails away from the anchor position. After the required number of seismic cables have been laid on the seabed, a backbone cable is then laid across the seismic cables, and a "wet" jointing process is carried out either by divers or by using a remotely operated vehicle (ROV) to provide connections between the seismic cables and the backbone cable.

This conventional method of deploying seismic sensor arrays not only requires accurate laying of the seismic cables and backbone cable to ensure that they are close enough together for the joints to be made, but also has the added disadvantage that the "wet" jointing process is both time-consuming and provides a less reliable joint than one which has been made "dry" (ie in air rather than in water). Furthermore, particularly in deep water operations, the requirement for the cable to extend vertically from the laying vessel to the seabed requires the cable to have substantial tensile strength and thus be of heavy construction. Furthermore, the time needed to lower the anchor to the seabed at the start of each cable laying operation and to retrieve the equipment at the end of each operation markedly increases the time needed for deploying an array of sensors, particularly if the array comprises many seismic cables.

In some sensor arrays, particularly seismic sensors, tension in the cable runs which extend between the sensor packages may give rise to unwanted interference with the sensor outputs, due to vibration of the stretched cable runs. In the conventional deployment method, additional measures have to be undertaken to relieve tension in the cable, either by using de-tensioners on-board the laying vessel or by towing a de-tensioning device along the seabed as the cable is laid through it. Both of these provisions reduce the speed at which cables may be deployed on the seabed, and increase the cost of deploying the sensor array.

An objective of the present invention is to provide a method and apparatus for deploying an array of sensors in which the sensors of a sensor array, or of a portion of a sensor array, are delivered in a single operation to a delivery location in or adjacent the area over which those sensors are to be deployed, with all of the sensors already connected to an input/output device. Individual sensors are then taken from the delivery location and placed in their operating positions, either to form a portion of a larger array, or to form an entire array. By providing the sensors already connected, the need to perform connection operations at the deployment site is avoided.

A further objective of the present invention is to provide a method and apparatus for deploying a plurality of sensor units from a delivery location, to form an array of spaced sensor units.

A yet further objective of the present invention is to provide a method and apparatus for deploying a subsea seismic sensor array in which the sensor array is delivered to a delivery location on the seabed in a single lifting operation, and the sensors are then moved from the delivery location to their operating positions.

A still further objective of the present invention is to provide a sensor unit, particularly for underwater seismic sensor packages, which comprises a housing having a penetrating portion adapted to be driven into a ground or seabed formation.

In a first aspect, the present invention provides an apparatus for deploying a sensor array over an area to be investigated, the sensor array comprising a plurality of sensor units joined together and to an output, in which the sensor units of the array are removably received in a carrier or deployment package and are connected together and to the output by signal conductors. Preferably, a plurality of sensor units are connected together to form a "chain" of connected sensor units, with one end of the chain being connected to the output. The sensor array preferably comprises a number of chains of connected sensor units. In operation, the deployment package is delivered to a point within or adjacent the area to be investigated, and the sensor units are then removed from the deployment package and distributed over the area to be investigated.

The deployment package may comprise a frame having handling formations to enable the carrier to be delivered as a unit, for example by being lifted into position by means of a crane. The input/output cable is preferably removably accommodated on the frame of the carrier.

The deployment package may be of modular construction, having a base module accommodating an output connection unit, optionally an input/output cable in a compact configuration, and optionally a number of sensor units and their connecting cables in compact configurations. Further modules may be added to the base unit, each further module comprising a number of sensor units and their connecting cables. In one embodiment of the deployment package, all of the cables are led to the connection unit and are connected to the input/output cable. In an alternative embodiment, the base module comprises only the output connection unit and additional modules accommodate optionally an input/output cable in a compact configuration, and a number of sensor units and their connecting cables in compact configurations. In a yet further alternative, the input/output cable is connected to the output connection unit, but is not stored in the deployment apparatus but is separate therefrom. In this embodiment, the input/output cable is paid over the side of the ship as the deployment package is lowered to the seabed.

Each sensor unit in the deployment package may be coupled to at least one other sensor unit by means of a connecting cable, which may be a fibre optic cable.

Each sensor unit may comprise a housing enclosing a number of sensors and a supply of connecting cable. The supply of connecting cable may be wound on a spool. The supply of connecting cable may alternatively be flaked down in a cavity within the sensor unit, so that by pulling an end of the cable, connecting cable may be fed out of the cavity. The cable connecting two sensors together may, however, be housed externally of both the sensor units, optionally in a cable container.

The deployment package may comprise a cartridge containing a number of sensor units, and optionally a number of cable containers. The cartridge may be detachably mounted to the deployment package.

In a further embodiment, each sensor unit may have its housing formed with male and female cable-retaining formations, such that two sensor units when brought together may define a cavity within which the connecting cable can be accommodated. The deployment package may comprise a cartridge containing a number of sensor units, with the connecting cable joining two adjacent sensor units being accommodated within a cavity defined by male and female portions of the respective housings of the two sensor units.

In a further embodiment, the cable-retaining formations may comprise a male portion formed on the upper surface of a sensor unit which is additionally adapted to resist damage from objects moving over the seabed, and a female portion formed on the lower surface of another sensor unit and which is additionally adapted to improve seabed coupling.

The cartridge may include a deployment tool for sequentially removing sensor units from the cartridge and placing them in their respective operating positions.

The cartridge may be co-operable with a deployment tool for sequentially removing sensor units from the cartridge and placing them in their operating positions.

The cartridge may comprise sensor units each having a spool of connecting cable, and the deployment tool may include drive means for driving the spool of a sensor unit in rotation to pay connecting cable out of the sensor unit.

The cartridge may comprise mounting means for attaching the cartridge to a manned or a remotely-controlled vehicle such as either a free swimming submarine or a seabed vehicle.

The cartridge may be co-operable with a manipulating arm mounted to a vehicle for sequentially removing sensor units from the cartridge and placing them in their operating positions.

Each sensor unit may have a housing designed to penetrate into, or otherwise operatively couple with, a substrate into or onto which the sensor unit is to be deployed. The housing may have interchangeable penetrating or coupling portions.

The deployment package may comprise a number of sensor units mounted at spaced intervals along a seabed cable, and the seabed cable may be wound on a cable drum mounted to the deployment package. The cable drum may be detachable from the package for deploying the seabed cable and its sensor units. Alternatively, the seabed cable may be flaked in a container allowing the cable to be drawn out of the container and laid on the seabed. The container may be detachable from the deployment package.

The deployment package may further comprise an input/output signal cable attached to a connection unit on the deployment package, each chain of connected sensor units being further connected to the input/output signal cable at the connection unit.

The deployment package may comprise a number of cartridges containing sensor units, and a number of seabed cables. In the deployment package, the seabed cables may be wound on cable drums, stored in dispensing coils or flaked in containers.

In a second aspect, the invention provides a method of deploying a sensor array comprising:
 providing a plurality of sensor units each including a number of sensors;
 connecting each sensor unit to at least one other sensor unit to form a "chain" of connected sensor units;
 placing the chain of connected sensor units in a deployment device;
 mounting one or more deployment devices to a deployment package;
 placing the deployment package in or adjacent to an area over which the sensor array is to be deployed;
 deploying the sensor units to respective operating positions in the said area, by sequentially deploying sensor units from a deployment device.

The deployment device may comprise a cable drum on which is wound a cable with sensor units spaced at predetermined intervals along the cable, the sensor units being deployed over the said area by unwinding the cable from the drum. The cable may be unwound from the drum by pulling a free end of the cable off the drum. The cable may be unwound from the drum by driving the drum in rotation. The drum may be moved as the cable is unwound.

The deployment device may comprise a container within which a cable and sensor units are flaked down, the sensor units being deployed either by pulling a free end of the cable to draw the cable and sensors out of the container, or by moving the container so that the end of the cable secured to the package draws out the sensor cable from the container.

The deployment device may comprise a cartridge containing a plurality of sensor units, the sensor units being deployed over the said area by detaching the cartridge from the deployment package, and sequentially removing or ejecting the sensor units from the cartridge and placing them in their respective operating positions as the cartridge is moved over the area.

Preferably, the cartridge is moved from sensor operating position to sensor operating position, and remains stationary at a sensor operating position while a sensor unit is being deployed there. It is however foreseen that a sensor unit may be ejected from the cartridge at its operating position while the cartridge is in motion.

While the cartridge is being moved between sensor operating positions, drive means may operate to pay the connecting cable out of the next sensor unit to be positioned. Alternatively, the connecting cable may be drawn out of the cartridge or out of a sensor unit by the tension produced in the connecting cable as the cartridge is moved to the next sensor operating position.

In a third aspect, the invention provides a sensor unit for an undersea seismic array, the sensor unit comprising:
 a housing enclosing a number of seismic sensors;
 a cavity within the housing for receiving a length of connecting cable;
 first connecting means for connecting a first end of the connecting cable to the seismic sensors; and
 second connection means for connecting the first end of the connecting cable to a second end of a connecting cable of another like sensor unit.

The length of connecting cable may be receivable in the cavity by winding the cable on to a spool mounted within the cavity.

The spool may be provided with driving means engagable from outside the housing to rotate the spool.

The spool may be provided with means to sense tension in the connecting cable, and driving means operable in response to a sensed tension in the connecting cable to rotate the spool so as to pay out cable and reduce the sensed tension.

Alternatively, the length of connecting cable may be received in the cavity as a coil, or flaked down in a serpentine or FIG. 8 configuration, and may be drawn out of the cavity by tension applied to one end of the cable while the other end of the cable is connected to the first connecting means.

The housing may have a penetrating portion shaped to facilitate penetration of the housing into a substrate. The penetrating portion may be removable.

In a fourth aspect, the invention provides a sensor unit for an undersea seismic array, the sensor unit comprising:
  a housing enclosing a number of seismic sensors;
  the housing being formed with male and female cable-retaining formations, such that two sensor units when brought together may define a cavity for receiving a length of connecting cable;
  first connecting means for connecting a first end of the connecting cable to the seismic sensors; and
  second connection means for connecting the first end of the connecting cable to a second end of a connecting cable of another like sensor unit.

In a fifth aspect, the invention provides a cartridge adapted to contain a plurality of sensor units mounted for sequential ejection from the cartridge.

The cartridge may be adapted to move the sensor units so as to sequentially present the sensor units at an ejection position of the cartridge.

The cartridge may comprise an ejection tool operable to eject a sensor unit at the ejection position from the cartridge.

The cartridge may be co-operable with an ejection tool operable to eject a sensor unit at the ejection position from the cartridge.

The sensor units may be moved toward the ejection position by gravity, resilient means, or by a motorised drive means. The sensor units may move toward the ejection position in steps, each step resulting in the ejection of a sensor unit from the cartridge at the ejection position. The movement may be caused by an ejection tool pushing a row of sensor units within a cartridge in a stepwise manner.

The cartridge may comprise means to hold a plurality of sensor units in fixed positions within the cartridge, each sensor unit being ejectable from the cartridge from its fixed position.

The cartridge may further comprise an ejection tool movably mounted to the cartridge and sequentially co-operable with the sensor units.

The cartridge may be co-operable with an ejection tool movable relative to the cartridge and sequentially co-operable with the sensor units.

The ejection tool may comprise a hydraulic ram.

The ejection tool may comprise a drive element co-operable with a drive coupling of a spool mounted to a sensor unit, the drive element being operable to rotate the spool and pay out a connecting cable from the sensor unit.

In a sixth aspect, the invention provides a method for positioning sensor units at their respective operating positions from a deployment device, comprising:
  placing first and second sensor units connected by a connecting cable in a deployment device;
  placing the deployment device at a first sensor operating position;
  ejecting the first sensor unit from the deployment device at the first sensor operating position;
  moving the deployment device to a second sensor operating position; and
  ejecting the second sensor unit from the deployment device at the second sensor operating position.

Ejection of the sensor unit from the cartridge may place the sensor unit directly into its operating position. Alternatively, ejection may deliver the sensor unit onto the ground or seabed, and a subsequent operation may then place the sensor unit in its operating position.

Embodiments of the invention will now be described in detail with reference to the accompanying drawings, in which:

FIG. 11 is a view similar to FIG. 10, showing an alternative deployment device;

FIG. 12 illustrates an alternative deployment cartridge for use with the disc-shaped sensor units;

FIG. 13 illustrates a deployment package comprising a number of the deployment cartridges of FIG. 17 arranged in a package;

FIG. 14 is a view of a sensor unit whose external casing is disc-shaped;

Figure 1:
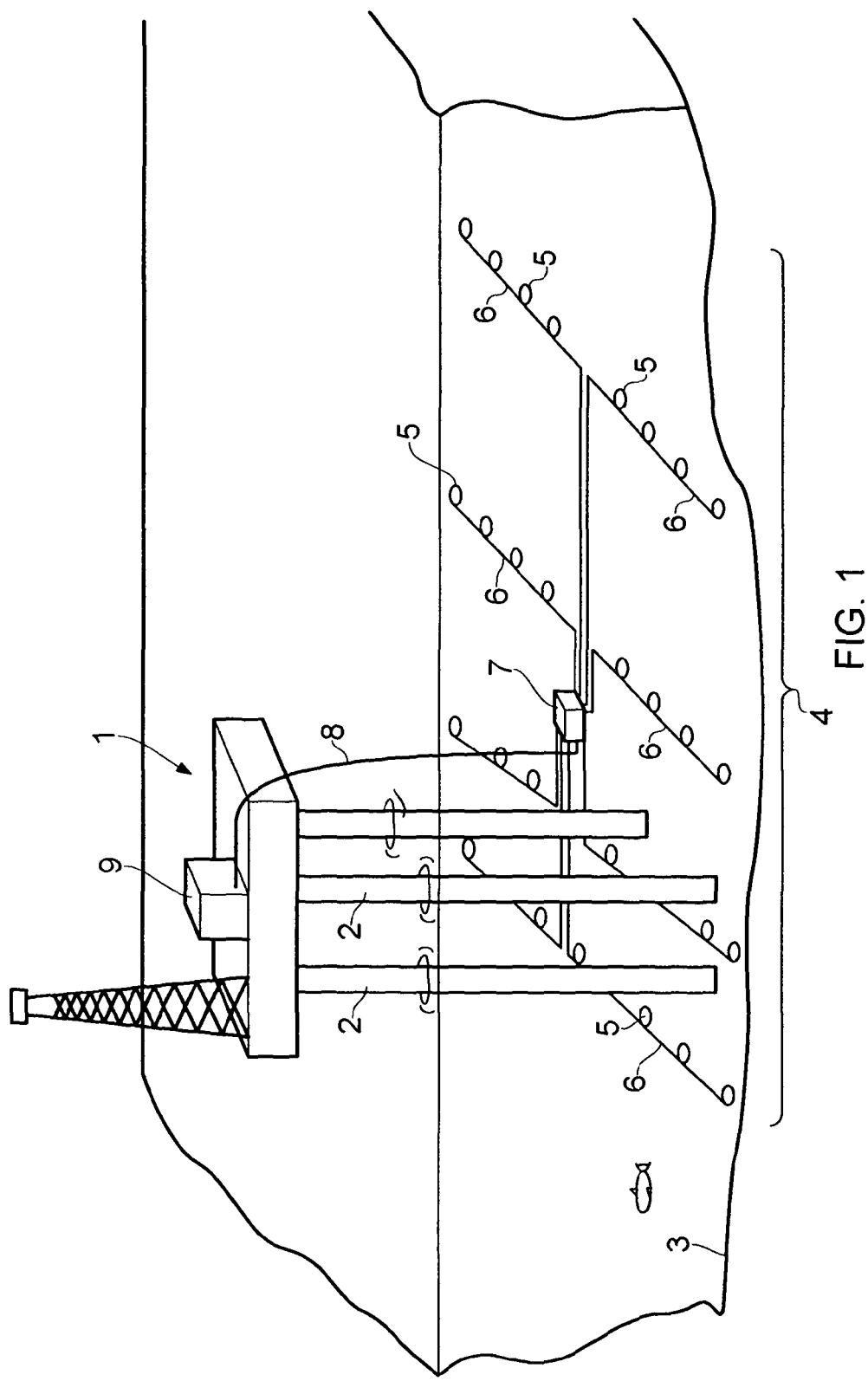
FIG. 1 is a schematic view of a seismic sensor array deployed on a seabed using the method and apparatus of the present invention.

FIGS. 15 and 16 illustrate, in side view, alternative arrangements of the sensor unit having a conical top surface and seabed-engaging spikes; and FIGS. 17 and 18 illustrate disc-shaped sensor units in which an upper surface of one sensor unit and a lower surface of a second sensor unit co-operate to form a cavity to accommodate a coil of connecting cable. Referring now to FIG. 1, there is seen a marine oil platform 1, supported on legs 2 from the seabed 3. A seismic sensor array 4 is deployed on the seabed 3 beneath and adjacent to the platform 1.

The seismic sensor array comprises a plurality of sensor units 5 joined together in chains by connecting cables 6. The connecting cables 6 lead to a hub 7, where all of the connecting cables 6 are joined to an input/output cable 8. The input/output cable 8 extends from the hub 7 to an operating system 9 on the platform 1. Signals are sent to the sensor units 5, and returns are received from the sensor units 5 at the operating system 9, where the signal returns are analysed in order to determine the nature of the structures beneath the seabed 3.

The exact manner in which these signals are sent, received and processed by the operating system 9 is well known, and will not be described in detail here.

The present invention is concerned with methods and apparatus for deploying a seismic sensor array 4 such as is shown in FIG. 1.

Figure 2:
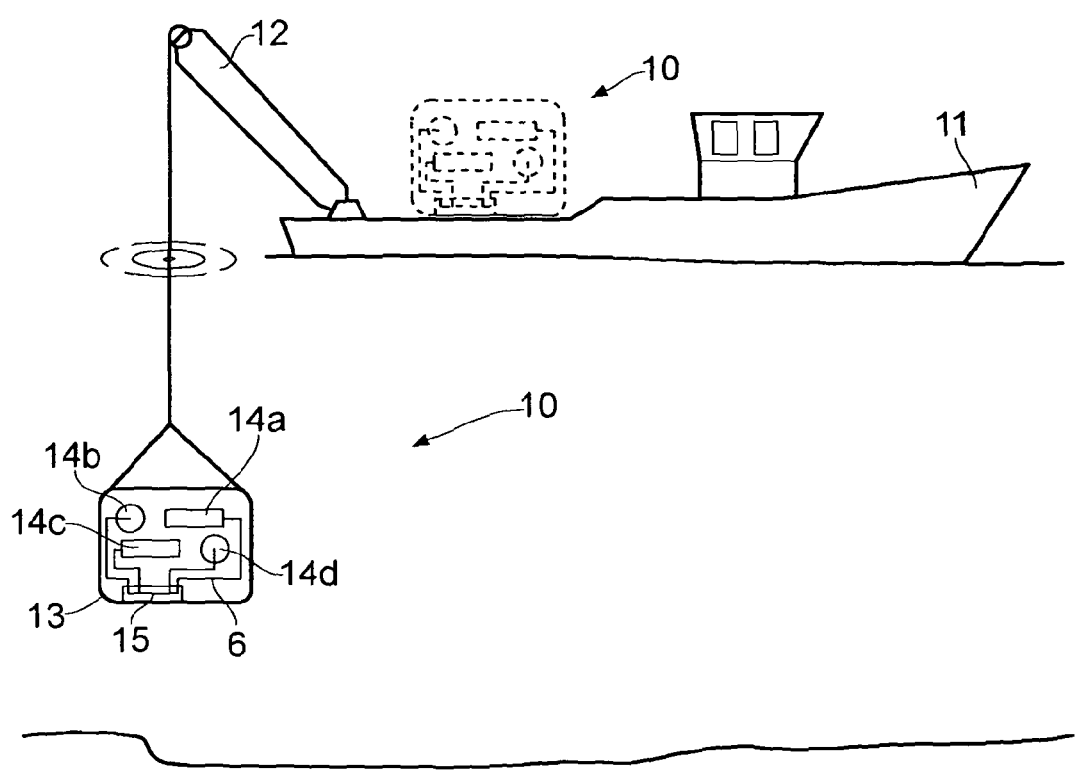
FIG. 2 is a schematic illustration showing the placing of the deployment package.

FIG. 2 illustrates an initial stage in the deployment process. A deployment package 10 is taken by ship 11 to the area of the seabed 3 on which the seismic sensor array 4 is to be laid out. From its transport position (shown in broken line) on the ship 11, the deployment package 10 is hoisted overboard and lowered to the seabed 3 by means of a crane 12 or other lifting equipment provided on the ship 11.

The deployment package 10 comprises a frame 13 to which are mounted a number of deployment devices 14a to 14d, and a connection hub 15.

Deployment devices 14a and 14c each comprise a cartridge containing a plurality of sensor units 5 joined together by connection cables 6, and will be described in more detail later. Deployment device 14b comprises a cable drum, on which is wound a seabed cable 16 having sensor units 5 spaced at intervals along its length, similar to a conventional seismic cable. Deployment device 14d comprises, in this embodiment, a cable drum having wound thereon a length of input/output cable 8.

The connection cables 6 joined to the sensor units 5 of deployment devices 14a and 14c, and the seabed cable 16 joined to the sensor units 5 of deployment device 14b, are all led to the connection hub 15, and therein are all connected to one end of the input/output cable 8 which is wound on the drum 14d of the deployment device. The connection hub 15 preferably comprises cable clamps to fix the cables relative to the hub, to prevent tension in the cables 6 and 16 from being transmitted to the connections. The connection cables 6 and seabed cable 16 are preferably led round the outside of the deployment package, most preferably in cable-receiving recesses. By leading the cables round the outside of the package, the cables extend flat along the seabed from the deployment package when the sensor units are placed in their operating positions. Snagging of the cables while the deployment package is being handled prior to placement on the seabed will be minimised if the cables are received in channels in the outside surface of the deployment package.

Figure 3:
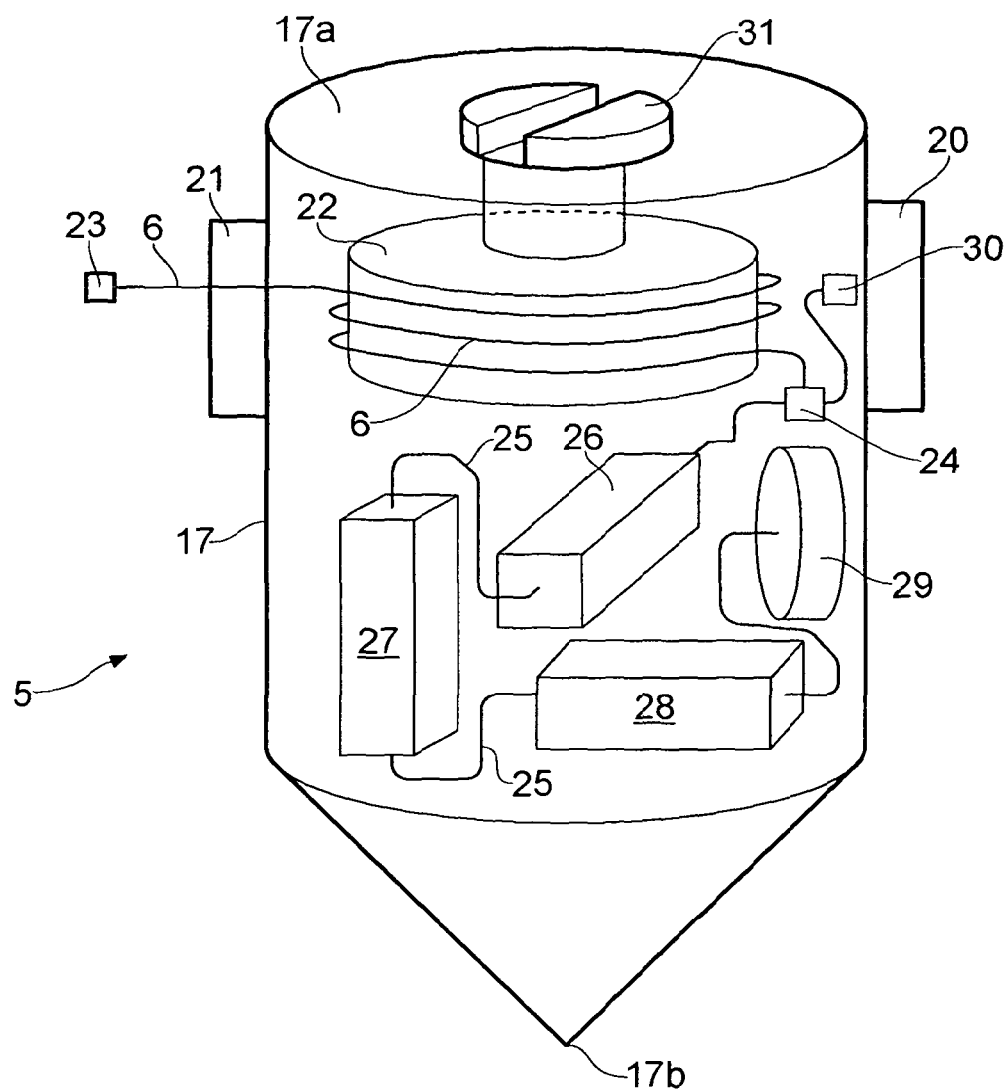
FIG. 3 is a schematic view of a sensor unit, to an enlarged scale.

A sensor unit 5 is schematically illustrated in FIG. 3. Each sensor unit comprises a housing 17 of generally cylindrical form, having a conical penetrating point 17b at one end. At its end opposite the penetrating point 17b, the housing has a flat surface 17a, strengthened to be engaged by an ejection device for pushing the sensor unit 5 into a substrate. Adjacent the flat surface 17a, the housing has a cable entry point 20 and a cable exit point 21.

Within the housing 17 there is contained a cable spool 22, on which is wound a length of connecting cable 6. One end of the connecting cable 6 is led out of the cable exit point 21, and ends in a termination 23. The other end of the connecting cable 6 is led to a cable connector 24 within the housing 17. At the cable connector 24, the cable 6 is joined to a sensor cable 25, which connects in series three seismic sensors 26, 27 and 28 and a hydrophone 29. Connector 24 is also linked to a termination 30, which is co-operable with the termination 23 at the free end of the connecting cable 6 of another like sensor unit. By introducing the termination 23 of a first sensor unit 5 through the cable entry point 20 of a second sensor unit and connecting it to termination 30, the two sensor units may be connected. By introducing the termination 23 of the second sensor unit 5 through the cable entry point 20 of a third sensor unit and connecting it to termination 30, the three sensor units may be connected in a "chain".

The spool 22 may be mounted for free rotation within the housing 17, and the cable exit point 21 may be provided with a friction device to prevent the cable 6 from leaving the housing until a predetermined amount of tension is applied to the cable 6. Alternatively, the spool 22 may be connected to a drive means operable to rotate the spool to pay cable 6 out of the exit point 21. The drive means may comprise a motor mounted within the sensor unit housing 17, or may comprise a drive coupling 31 accessible from outside the housing 17 and engagable by a drive means to rotate the spool 22.

The seismic sensors 26, 27 and 28 and hydrophone 29 are preferably fibre optic devices, and the connection cable 6 will then comprise a number of optical fibres for connecting the sensors of each sensor unit to its neighbours in the chain. In one embodiment, a continuous length of cable 6 may connect all of the sensor units in a deployment device. The cable may have a number of optical fibre pairs running along its length, and at each sensor unit a pair of fibres may be drawn out of the cable and connected to the sensors of that sensor unit.

It is furthermore foreseen that the sensors 26, 27, 28 and 29 may be of any convenient type, for example electrical coils, magnetic sensors or other sensors producing an electrical output rather than an optical output. In this case, the connecting cable 6 may be an electrically conducting cable rather than an optical fibre.

The penetrating point 17b of the housing may be formed as an integral part of the housing 17, or it may be a detachable element. Different shapes of penetrating point 17b may be provided, for selective attachment to the housing 17 of the sensor unit 5, depending on the nature of the seabed 3 where the sensor array is to be deployed. In areas of the seabed where penetration is not possible, such as where the seabed is formed of hard rock, the penetrating point 17b may be substituted by an element whose shape and configuration will provide an effective seismic coupling to the seabed.

Figure 4:
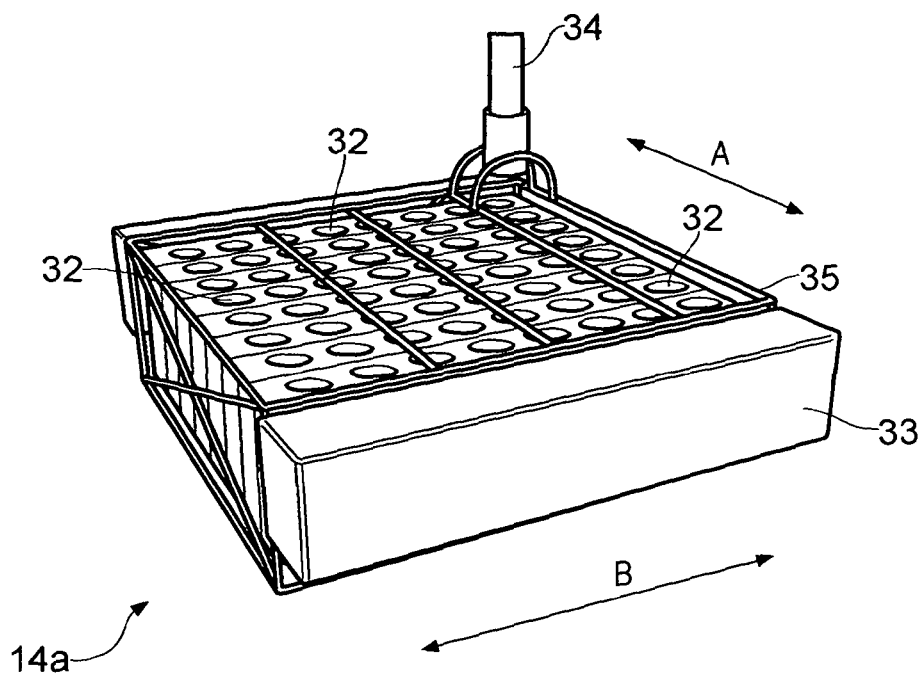
FIG. 4 is a perspective view of a cartridge with an ejection tool mounted thereto.

An example of a deployment device 14a is seen in FIG. 4. The deployment device comprises a generally square cartridge, and includes sixty-four sockets 32 arranged in eight columns of eight sockets. A pair of buoyancy elements 33 are attached to opposite sides of the cartridge, in order to reduce its weight under water and facilitate handling the cartridge by an ROV.

The sockets 32 are generally tubular and extend through the cartridge. Each socket 32 can accommodate a sensor unit 5, and is adapted to allow the sensor unit to be pushed axially out of the socket by an ejection device 34. The ejection device 34 is mounted for movement along a travelling beam 35 in the direction of arrow A in FIG. 4. The beam 35 is mounted to the cartridge 14a for transverse movement, in the direction of Arrow B of FIG. 4. Drive means (not shown) are provided to move the beam 35 relative to the cartridge 14a, and to move the ejection device 34 along the length of the beam, so that the ejection device 34 may be positioned in alignment with any one of the sockets 32. The ejection means 34 may further be provided with a drive coupling co-operable with the drive coupling 31 of a sensor unit 5, so that when the ejection device 34 is positioned to engage a sensor unit, the spool 22 of the sensor unit may be driven by the ejection device to pay out connecting cable 6 from the housing of the sensor unit.

Figure 6:
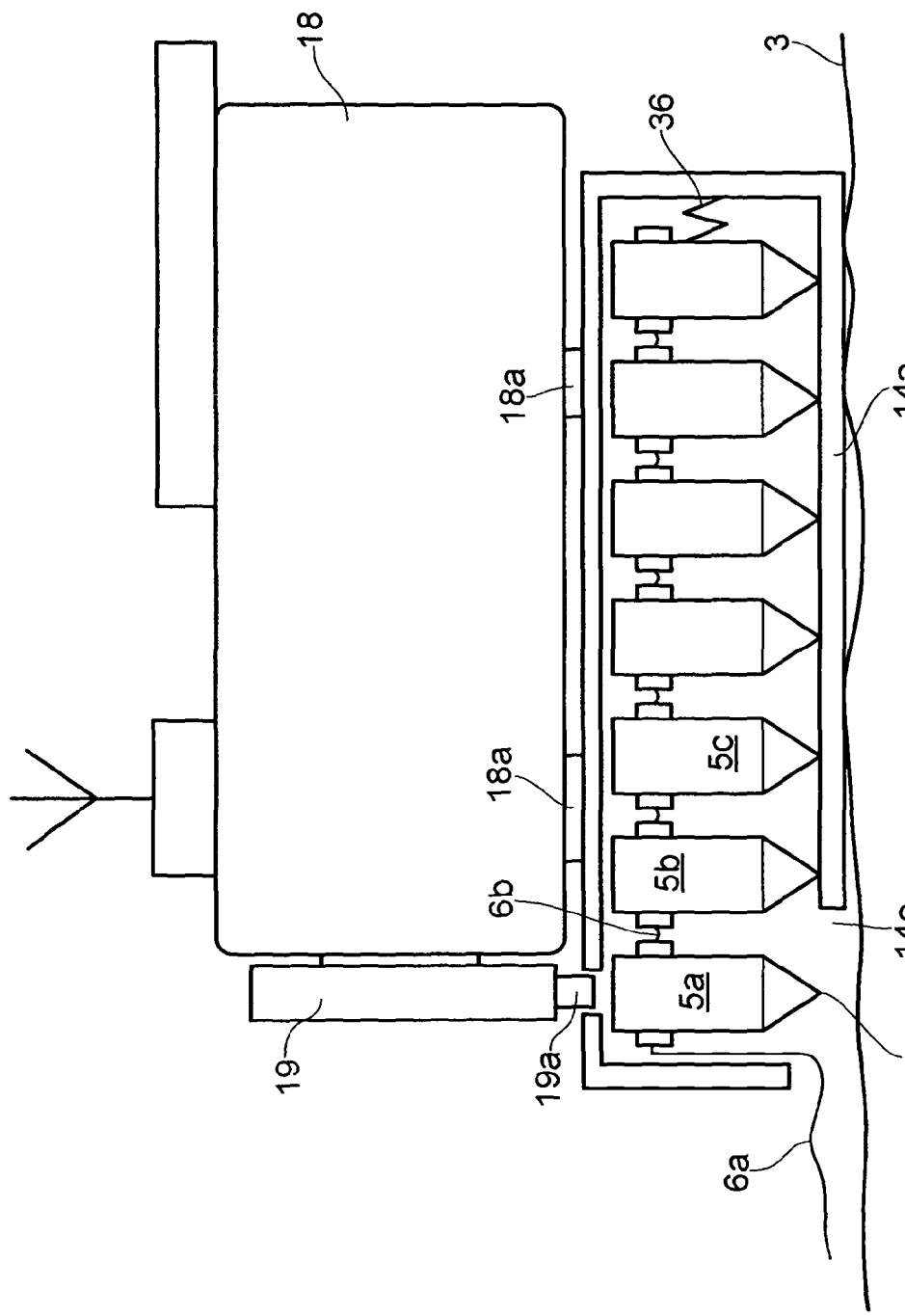
FIGS. 6 to 8 are schematic illustrations showing three stages in the positioning of a sensor unit from a cartridge.
Figure 7:
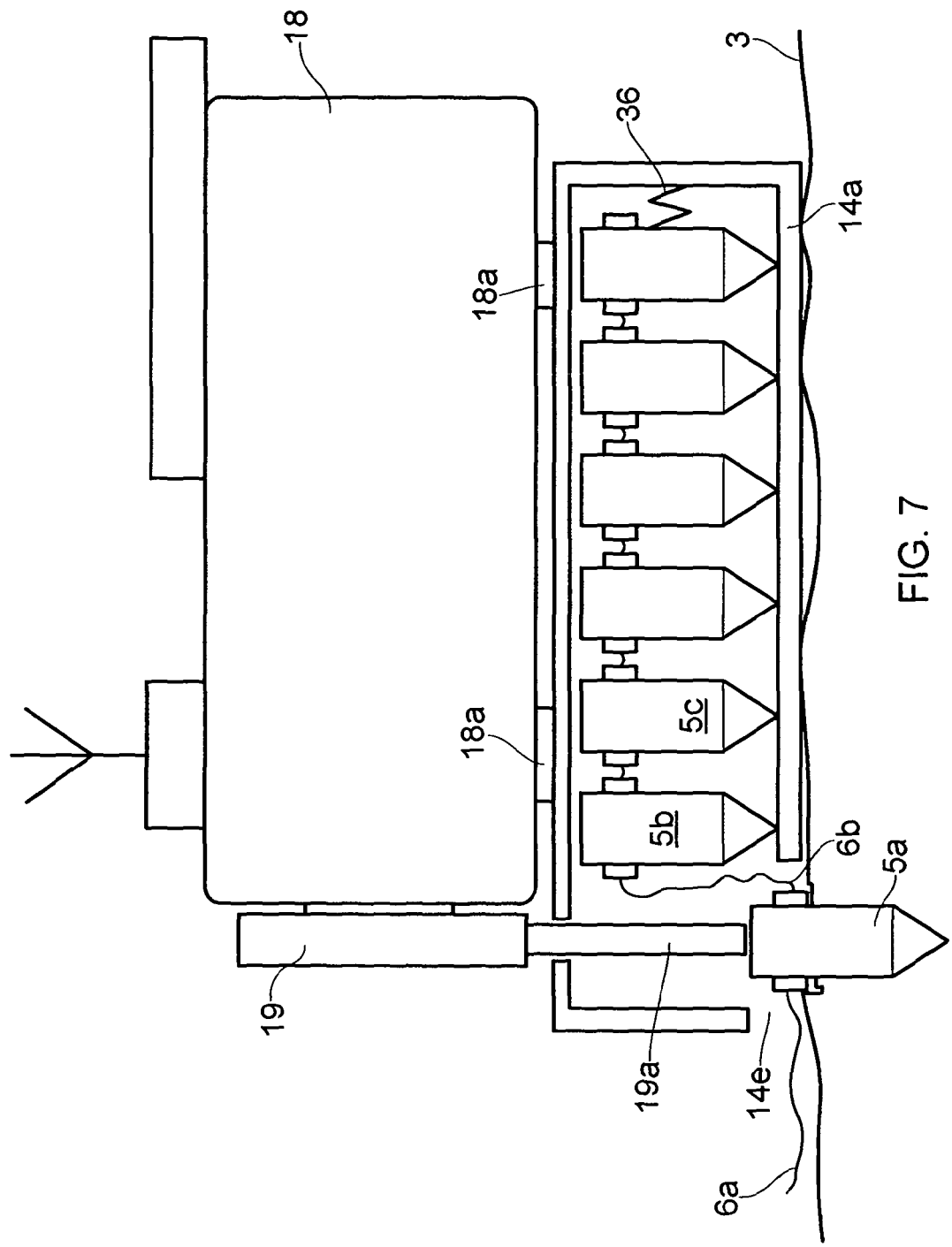
Figure 8:
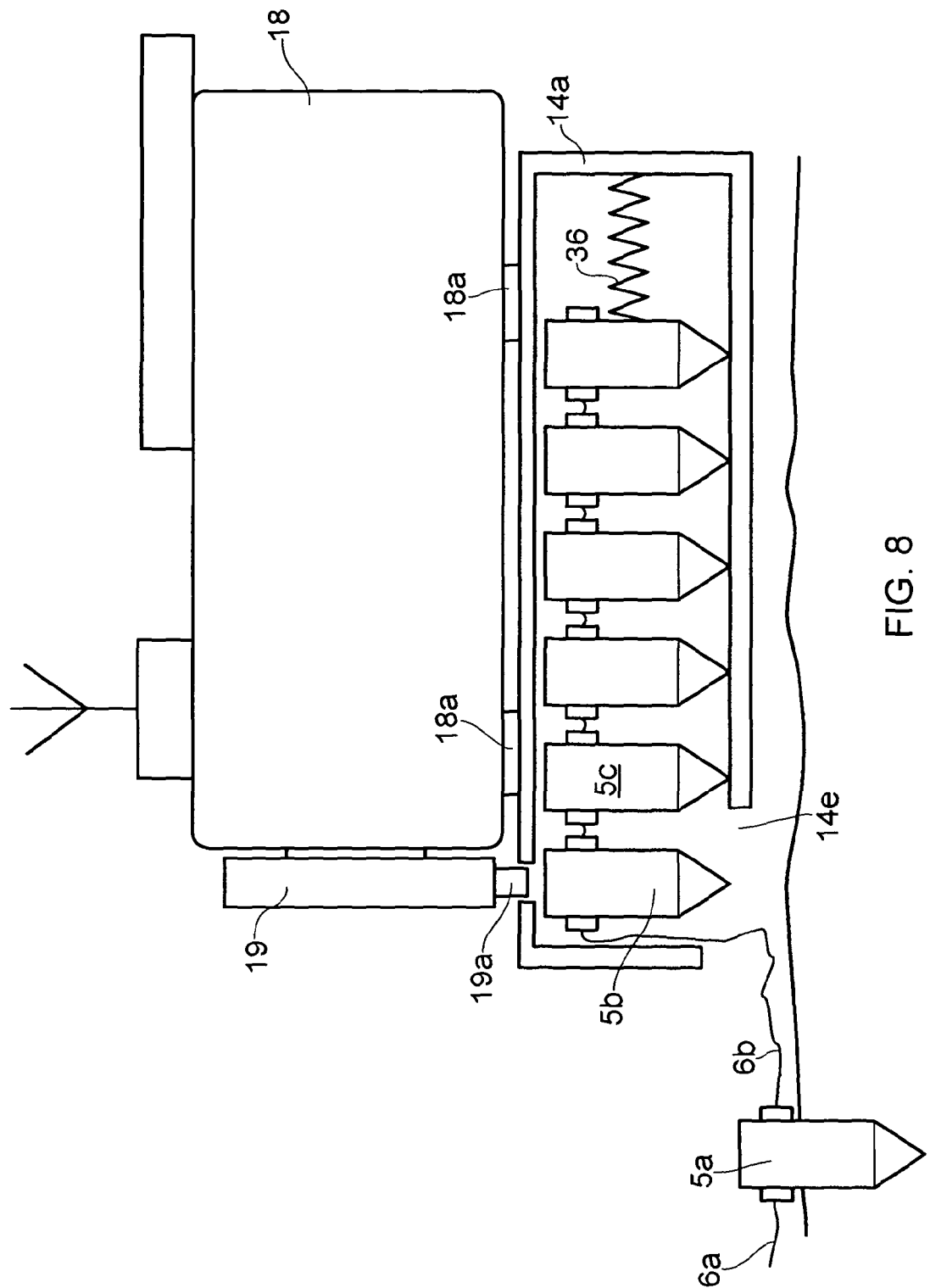

Turning now to FIGS. 6 to 8, an alternative embodiment of the cartridge is shown. In the previous embodiment, each sensor unit remains in a fixed position relative to the cartridge until the ejection device engages that sensor unit and pushes it out of the cartridge. In this embodiment, the sensor units are received within the cartridge in such a manner as to be movable within the cartridge towards an ejection position at a predetermined location on the cartridge.

The cartridge of FIGS. 6 to 8 comprises a housing containing a number of sensor units 5a, 5b, 5c etc. The sensor units are accommodated in a row, and are urged toward an ejection position at the left-hand end of the cartridge (as seen in the figure) by means of a spring 36. The spring 36 may, in other embodiments, be replaced by an alternative means for urging a sensor unit 5 into the ejection position.

The sensor units 5 are connected together by connecting cables 6, each sensor unit having a length of connecting cable 6 contained within it so as to be able to be drawn or fed out of the sensor unit as required. The sensor units are connected in a "chain" and are positioned within the cartridge so that they are moved towards the ejection position in the order in which they are connected in the chain.

The positioning of a chain of sensors will now be described, in relation to the cartridge of FIGS. 5 to 8. Once the deployment package 10 has been placed on the seabed, a remotely-operated vehicle (ROV) is launched and approaches the deployment package 10.

The ROV 18 in this embodiment is equipped with holding means 18a capable of gripping and holding the cartridge 14a, and detaching it from the deployment package 10. ROV 18 is also equipped with an ejection device 19, which is positioned so as to engage a sensor unit 5 at an ejection position in the cartridge 14a. The ejection device 19 is operable to push a sensor unit 5 out of the cartridge 14a.

Figure 5:
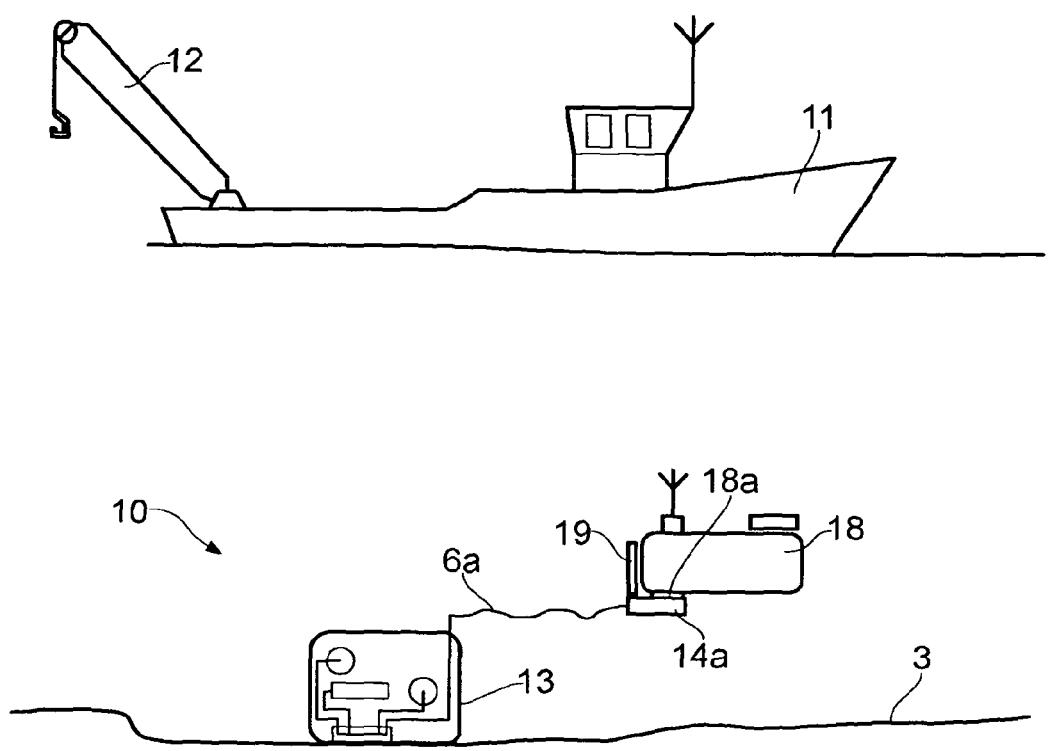
FIG. 5 is a schematic illustration showing the removal of a cartridge from the deployment package.

As seen in FIG. 5, the ROV 18 approaches the deployment package 10, picks up the cartridge 14a, and retreats from the deployment package 10 toward the position where the first sensor unit 5a is to be placed. As the ROV 18 moves the cartridge 14a away, the connecting cable 6a housed in the first sensor unit 5a is paid out and laid along the seabed 3. The cable 6a may be drawn out of the housing 17 of the sensor unit 5a by the tension in the cable 6a pulling it from the spool 22 of sensor unit 5a. Alternatively, the ejection device 19 may include a drive coupling which engages the drive coupling 31 of the sensor unit 5a, so that the spool 22 is driven to pay out the cable. With this alternative, the spool 22 may be driven at a speed corresponding to the speed of movement of the ROV and thus ensure that the cable 6a is paid out at a rate which not only avoids tension in the cable, but also avoids excessive slack. The number of revolutions of the spool may also be counted, to ensure that movement of the cartridge 14a is stopped before the cable is paid out to the bitter end. In a further alternative, the sensor unit 5 may be provided with a tension sensor to detect tension in the connecting cable, and control means may be provided to control the rate at which cable is paid out of the sensor unit in order to avoid excessive tension or excessive slack in the cable.

When the ROV 18 reaches the position for deploying the first sensor unit Sa, the cartridge 14a is placed on the seabed 3 and the ejection device 19 is operated to extend a pusher 19a into engagement with the end surface 17a of the housing 17 of the sensor unit 5a. Continued extension of the pusher 19a urges the sensor unit 5a out of the cartridge 14a through opening 14e, so that the penetrating point 17b enters the seabed material and firmly anchors and couples the sensor unit 5a to the seabed.

As the sensor unit 5a moves out of the cartridge 14a, connecting cable 6b is drawn out of the housing of the second sensor unit 5b. Alternatively, the sensor units 5 may be accommodated in the cartridge 14a with sufficient slack in the connecting cables 6 between each two sensor units to permit one of them to be positioned out of the cartridge without over-stressing the connecting cable.

When the first sensor unit is in place, as seen in FIG. 7, the pusher 19a is retracted to its initial position. Spring 36 then urges the row of sensor units 5 to the left, as seen in FIG. 8. This presents the second sensor unit 5b at the ejection position, opposite the opening 14e. The cartridge is then moved to the position for placing the second sensor unit, with the connecting cable 6b housed in the second connecting unit 5b being paid or drawn out as before to lie on the seabed as the cartridge is moved.

The ejection operation is then repeated, until all of the sensor units 5 in the cartridge 14a have been positioned in the seabed. The empty cartridge may then be released, either to lie on the seabed or to float to the surface for retrieval and re-use. The ROV may return to the deployment package 10 to replace the empty cartridge and pick up a second cartridge 14c and repeat the operation to lay a second chain of sensor units.

To eliminate residual tension in the connecting cables between the sensors, either as each sensor unit is positioned, or after the chain of sensor units has been laid, a gripping device mounted either on the cartridge or on the ROV may be used to grasp the connecting cable between each adjacent two sensor units, and draw more cable out from one of the sensor units to relieve any residual cable tension.

In embodiments where a length of the connecting cable is held on a spool within each sensor unit and the spool is rotatable by an external drive coupling, residual tension in the connecting cable may be relieved by driving the spool by a predetermined additional amount after the sensor unit has been positioned in the seabed to pay out an additional length of cable.

Alternatively, in embodiments where the connecting cable is flaked down within a cavity in the sensor unit, residual tension in the connecting cable may be avoided during positioning of the sensor units by moving the cartridge past the next sensor position to draw out excess cable (either from the last sensor unit positioned or from the sensor unit next to be positioned), and then returning to that sensor position to eject the next sensor unit from the cartridge.

In the foregoing description the sensor units are described as being positioned in a row within the cartridge. It is however foreseen that the sensor units may move along a spiral or serpentine path within the cartridge, provided that the sensor units are presented sequentially in their correct order at the ejection position.

Figure 3A:
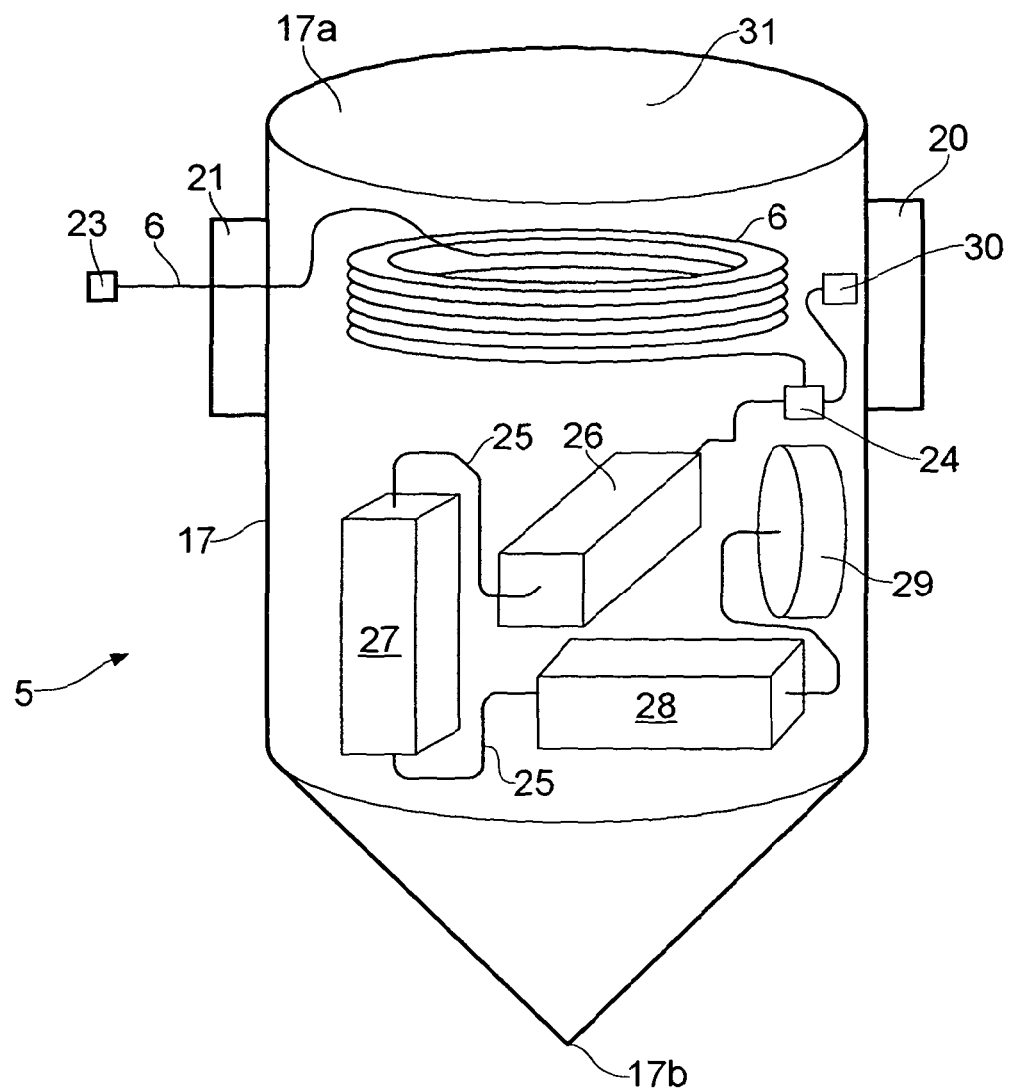
FIG. 3A is a schematic view of a sensor unit, similar to FIG. 3, showing an alternative arrangement for storing the connecting cable.

In the embodiment described above with reference to FIG. 3, the connecting cable 6 is pulled or fed out of the sensor unit housing as the spool 22 rotates. In the arrangement shown in FIG. 3A, the connecting cable 6 is wound as a coil and is received within a cavity in the housing 17 of the sensor unit 3 rather than being wound on to a spool. The coil may be oriented within the housing such that the axis of the coil passes through, or close to, the cable exit point 21. The cable may be held in a coiled condition by being coated prior to coiling with an adhesive or a wax which solidifies to hold the coils in place, yet is weak enough to allow the cable to be pulled off the coil. One end of the connecting cable 6 is led out from the inside of the coil through the cable exit point 21. The other end of the connecting cable 6 is led, from the outside of the coil, to the cable connector 24. As the sensor unit is moved away from a previously-deployed sensor unit, the connecting cable 6 is pulled out through the cable exit point 21 because the one end is connected to the previously-deployed sensor unit. This deployment method may impart a twist to the cable, but since the cable is of light construction the twist is easily accommodated. Alternatively, the winding direction of the cable coil may be reversed mid-way along the length of the connecting cable, so that any twist built up during deployment of the cable before the reversal is taken out of the cable during the deployment of the cable after the reversal. In a further alternative, a reverse pre-twist may be applied during the winding of the cable coil, so that the twist imparted during deployment will return the cable to neutral torsion.

Figure 3B:
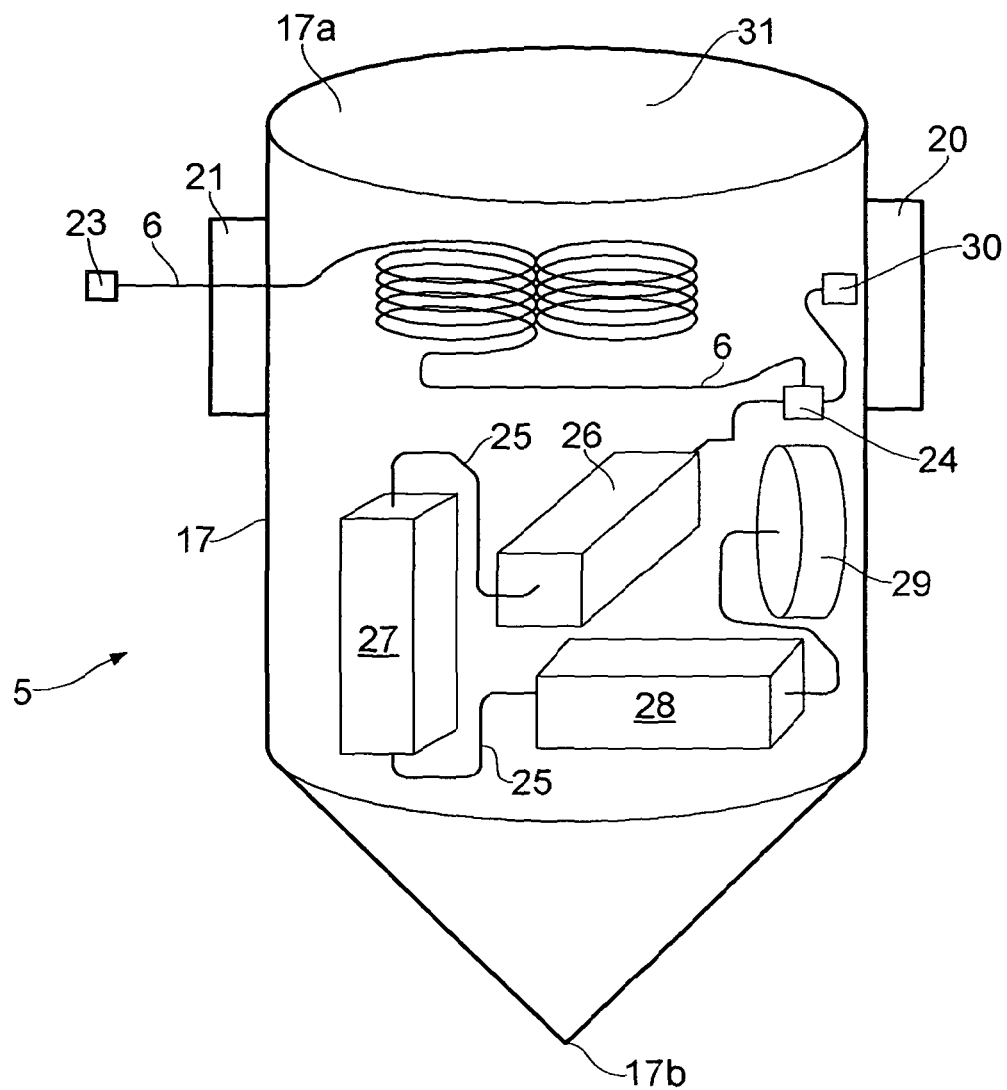
FIG. 3B is a schematic view of a sensor unit, similar to FIGS. 3 and 3A, showing a further alternative arrangement for storing the connecting cable.

FIG. 3B shows an alternative arrangement for flaking the cable down into a cavity within the housing 17 of the sensor unit. In this arrangement, the cable is laid within the cavity in a series of figure-8 layers each comprising a pair of oppositely-handed loops or bights. One end of the cable is led out of the cable exit point 21, and at the other end is connected to the cable connector 24. As the cable is pulled out through the cable exit point 21, alternately-handed bights or loops of the cable are drawn out. Successive bights each impart a twist to the cable in alternating directions, resulting in the connecting cable 6 being laid substantially untwisted.

In a further alternative, the deployment package 10 comprises a deployment device 14b which is a cable drum, on which is wound a seabed cable 16 having seismic sensors 5 spaced along its length. This embodiment is shown in FIG. 9, with the seabed cable 16 partially drawn off the drum to show the sensor units 5 spaced along the cable 16.

Figure 9:
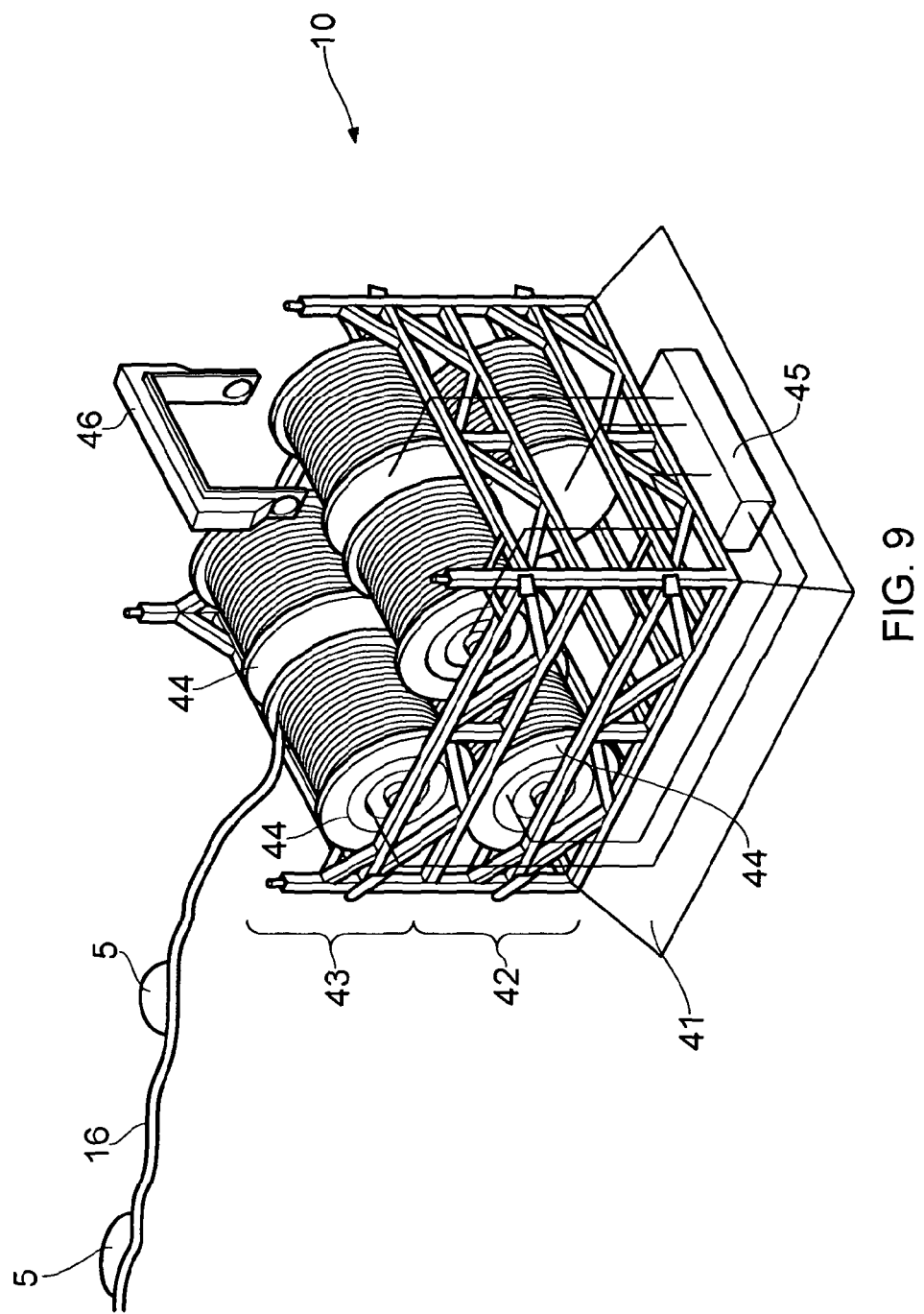
FIG. 9 is a perspective view of an alternative deployment package.

In order to deploy the seabed cable, the ROV 18 may pick up the cable drum and move away from the deployment package, for example using a straddle device 46 seen in FIG. 9. As the drum is moved away from the deployment package 10, the cable unwinds under its own tension from the drum in order to position the sensors on the seabed at their predetermined spacing. Alternatively, the ROV may be provided with means to drive the drum in rotation as it is being carried, so as to lay the seabed cable without applying tension to it. The drum driving means may be controlled to rotate the drum to pay out cable at a speed corresponding to the speed of travel of the ROV over the seabed.

In a yet further alternative, the ROV may simply grasp the free end of a seabed cable and move away from the deployment package so that the seabed cable unwinds from its drum and extends along the seabed. A rotary coupling may be provided between the cable drum and the connection hub, to cope with the twisting of the cable at that point, if this deployment method is to be used.

As an alternative deployment device, seen in FIG. 11, a seabed cable 16 with sensor units 5 spaced along its length may be attached at one end to the connection hub of the base module, and may be flaked down within a container 14 rather than wound on a drum. The container 14 may be detachably mounted to the deployment package 10, such that an ROV 18 may attach itself to the container away from the package 10, with the seabed cable 16 paying out of the container the movement continues. The container 14 may be provided with wheels or skids 14f for travelling over the seabed. When all the seabed cable is paid out, the container 14 may be released either to lie on the seabed or to float to the surface for retrieval, or may be returned to the deployment package for recovery to the surface. In an alternative arrangement (not illustrated), the container may remain secured to the deployment package 10 and have one end of the seabed cable secured to the connection hub, and the ROV may simply grasp the other end of the seabed cable and move away from the deployment package so that the seabed cable pays out from its container and extends along the seabed.

When all of the sensor units 5 have been positioned on the seabed, the ROV returns to the deployment package for a final time to collect the input/output cable 8 and optionally part or all of the deployment package, and return to the surface, paying out the input/output cable as it goes. At the surface, the end of the input/output cable is led to the operating system and the necessary connections are made for injecting and receiving signals to and from the seismic array. The retrieved deployment package components may then be conditioned for reuse, for example by refilling retrieved cartridges with sensor units and/or winding seabed cable onto retrieved drums.

Alternatively, the input/output cable 8 may be stored on a drum in the ship 11. One end of the input/output cable 8 is connected to the connection hub 15, and as the deployment package 10 is lowered overboard, the input/output cable 8 is paid out from the drum on the ship at a speed corresponding to the lowering of the package 10. This arrangement enables the package 10 to accommodate more sensor units, since no space in the package will be taken up by the input/output cable 8. When the package is placed on the seabed, the input/output cable 8 may be led away to the operating system 9 to make the necessary connections for transmitting and receiving signals to and from the sensor units of the seismic array.

The deployment package seen in FIG. 9 is of modular construction, and comprises a lowermost or base module 41, and two carrier modules 42 and 43. One carrier module 42 is mounted directly to the base module 41, and the other carrier module 43 is mounted on the carrier module 42. The carrier modules 42 and 43 accommodate sensor units 5 and their connecting cables 6 in deployment devices such as cartridges, or seabed cables 16 in deployment devices such as drums.

The base module 41 may be permanently positioned on the seabed, and may include a connection hub 45 to which the cables 6 and 16 are connected. The connection hub may be manufactured separately from, and attached releasably to, the base module 41. For example, the connection hub may be receivable within a recess in the base module 41. This arrangement permits the base module to be recovered from the seabed for reuse, leaving the connection hub on the seabed. Alternatively, the base module may be left in position over the connection hub, to protect the connection hub from damage by objects moving across the seabed. Separate strain relief arrangements may be provided on the cables 6 and 16 to co-operate with the base module 41, to prevent tension in the cables 6 and 16 from being transmitted to the connection hub 45.

Mounted above the base module 41 is a carrier module 42 which contains a number of deployment devices 44 containing sensor units 5, each of which has its connecting cable joined to the connection hub 45 of the base module 41. In the illustrated embodiment, the deployment devices 44 are drums, on which are wound seabed cables 16 with sensor units 5 spaced along them. One of the deployment devices 44 of the carrier module 42 may be a drum on which is wound an input/output cable 8.

The deployment package comprises a base module 41 and a number of carrier modules 42, 43 provided with all the sensor units, connecting cables and seabed cables necessary to form the entire sensor array, or to form a part of a larger array. The components in the deployment package are lowered to the seabed in a single lifting operation. Expensive lifting and transporting vessels are thus required for a minimum period, since the ROV may be deployed and operated from a smaller support vessel at much reduced cost. It is a further foreseen that the larger transport vessel may be used to deposit a number of deployment packages 10 on the seabed at prearranged locations in a single voyage, and then return to port. A smaller and less expensive vessel equipped with the ROV 18 may then visit each of the locations in turn to position the sensor units from their respective deployment packages on to the seabed to form seismic arrays at the prearranged locations.

Since the deployment package is lowered to the seabed using a crane and lifting cable, the connecting cables 6 and seabed cables 16 do not need to withstand the tensile forces generated when these cables are paid overboard from a surface vessel to be laid on the seabed. The cables may therefore be of much lighter and therefore cheaper construction, resulting in a further saving of costs as compared to conventional seismic cables. It is foreseen that the connecting cables 6 extending between individual sensor units 5 deployed from a cartridge may be of extremely light construction, since these cables will be subjected to little or no tension during deployment of the sensor units. In the case of seabed cables 16, these may be of slightly heavier construction if the deployment method for the sensors involves pulling the seabed cable 16 off the drum 44. If the seabed cable is deployed by moving and driving its drum, significantly lower tension will be applied to the seabed cable and thus it may be of lighter construction.

Figure 10:
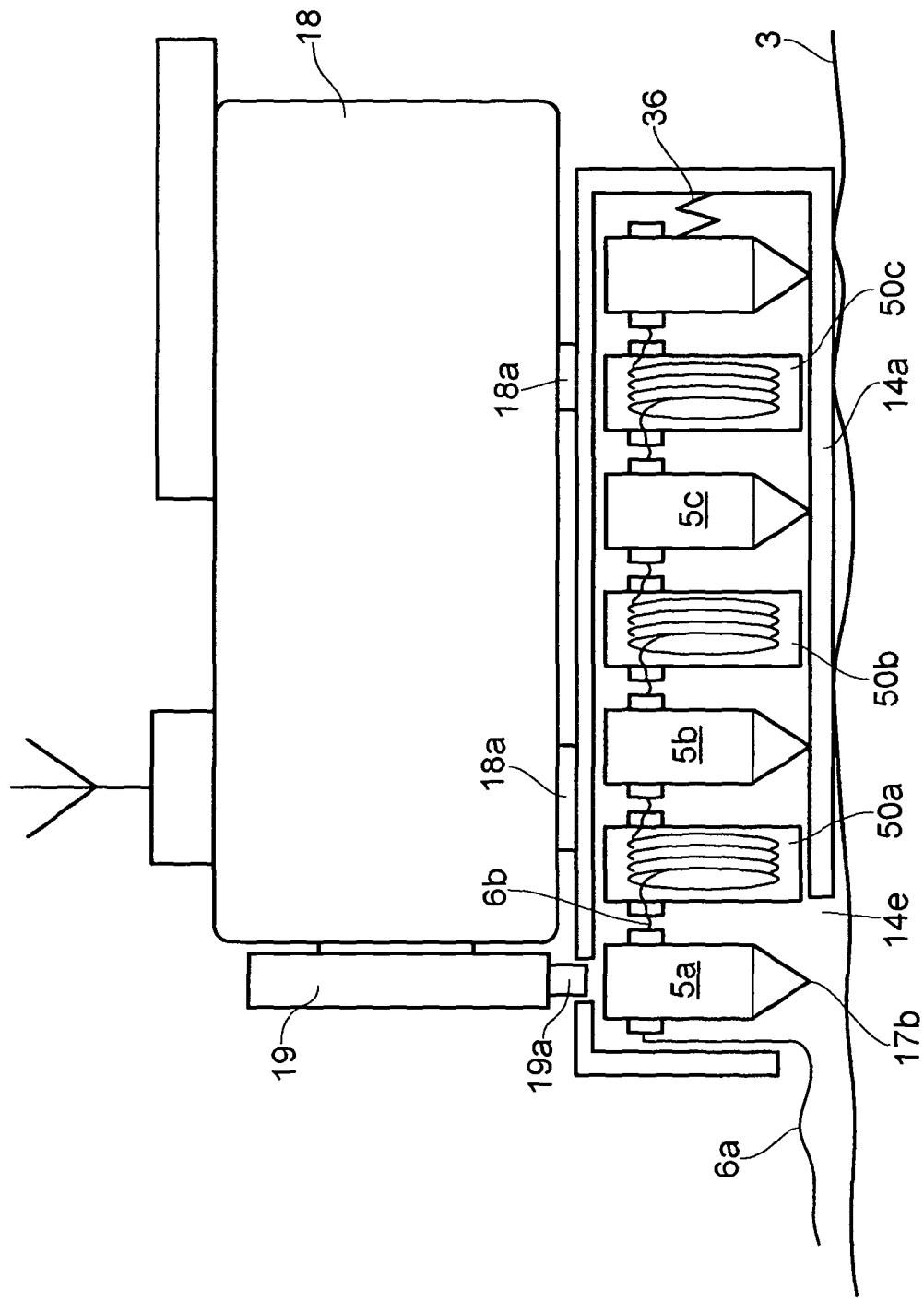
FIG. 10 is a view similar to FIG. 6, showing an alternative arrangement for a cartridge.

FIG. 10 is a view similar to FIG. 6, and shows an alternative arrangement for sensor units 5 within a cartridge 14. In this embodiment, the lengths of the connecting cable 6 which extend between adjacent sensor units are not held within the sensor units 5, but are stored separately in cable containers 50. Within the cartridge, a cable container 50 is positioned between each adjacent two sensor units 5. The sensor units and cable containers are accommodated in a row, and are urged toward an ejection position at the left-hand end of the cartridge (as seen in the figure) for example by means of a spring 36.

The cable containers 50a, 50b and 50c each accommodate a length of connecting cable 6 contained within it so as to be able to be drawn out of the cable container as required. The sensor units are positioned by ejecting them from the cartridge in the manner described in relation to FIGS. 6 to 8. After a sensor unit has been positioned, the pusher 19a retracts to its initial position, and the row of sensor units and cable containers is urged to the left (as seen in FIG. 10) to bring the first cable container 50a to the ejection position. The cable container 50a may be held at the ejection position while the cartridge is moved to the next sensor position, so that connecting cable from the cable container 50a is drawn out of the container as the cartridge is moved. When the next sensor position is reached, the cable container 50a may be ejected from the cartridge and the pusher 19a again retracted, to bring the second sensor unit 5b to the ejection position. The cartridge 14 may then be placed on the seabed, and the second sensor unit 5b positioned by pushing it out of the cartridge into the seabed material.

In a further alternative a length of connecting cable 6 may simply be positioned in the cartridge between each two sensor units 5 and held in place, for example by the pressure of spring 36 or by a retaining strap or loop (not shown). The connecting cable 6 may be held between co-operating formations of two adjacent sensor units 5 within the cartridge, such as by being wound on a projection of one sensor unit and surrounded by a flange of the adjacent sensor unit. As a sensor unit 5 is ejected from the cartridge, the length of connecting cable may also be ejected to lie on the seabed, to pay out by uncoiling as the cartridge is moved to the next sensor position.

In an alternative deployment package 100 illustrated in FIG. 13, eight tubular cartridges 101 are mounted within a frame 102 to form a part of the deployment package. Each tubular cartridge 101, as seen in FIG. 14, has an open ejection end 101a, and at its other end 101b is cooperable with a pusher (not shown) engagable with the sensor unit 103 adjacent that end of the cartridge.

Within each cartridge 101, a plurality of disc-shaped sensor units 103 are coaxially received. Between each pair of adjacent sensor units 103, a coil of connecting cable 104 is positioned. The coil of connecting cable 104 connects the two adjacent sensor units together.

Sensor units are ejected from the cartridge by a pusher entering the end 101b of the cartridge and urging all of the sensors toward the open ejection end 101a of the cartridge until one sensor is ejected. The cartridge is then moved to the next sensor position, and the pusher advanced by a further incremental step to eject the next sensor unit 103. The cartridge may be held vertically, with its lower open end 101a close to the seabed, so that the sensor units 103 are placed onto the seabed in the correct orientation. The end 101a of the cartridge may be provided with retaining means such as resilient retaining fingers to hold the sensor unit adjacent end 101a in place until it is pushed through the opening by the pusher.

FIG. 15 illustrates the disc-shaped sensor unit in position on the seabed, with its connecting cable leading away to the next sensor unit in the string.

In order to improve coupling of the sensor units to the seabed, the underside of the sensor unit 103 may be provided with spikes 105 or a depending flange 106, optionally castellated to form penetrating teeth. When ejecting the sensor units from the cartridge 101, the end 101a of the cartridge may be placed sufficiently close to the seabed that the pusher urges the spikes 105 or the flange 106 into the seabed as it ejects the sensor unit. Alternatively, the sensor unit may be simply placed on the seabed from the cartridge, and a further tool may then engage the sensor unit to push the spikes into engagement with the seabed.

The sensor units of FIGS. 16 and 17 are also shown with conical upper surfaces 107. Preferably, the sensor units are pushed sufficiently far into the seabed that there is no vertical sidewall exposed, and the conical upper surface 107 prevents the sensor unit from being snagged by items dragged across the seabed.

FIGS. 18 and 19 show an alternative manner of packing disc-shaped sensor units into the tubular cartridge 101. In this embodiment, each sensor unit has a disc-shaped base 110, from which a castellated flange 111 depends downwardly. Extending upwardly from the disc-shaped base 110 is a core 112 of reduced diameter compared to the base 110 and to the internal diameter of the castellated flange 111.

To pack sensors into the cartridge tube 101, the connecting cable 104 connecting a first sensor 103a to a second sensor 103b is wound round the core 112 of the first sensor 103a. The next sensor 103b is then placed with its castellated flange 111 surrounding the coil of cable 104 on the core 112, and with the under surface of its base 110 contacting the upper end of the core 112 of sensor 103a. Further sensor units are then added to the first two, until a stack of sensor units of the required length is formed. The stack of sensor units is then placed within the cartridge tube 101, with the castellated flanges of the sensor units protecting the coils of connecting cable.

The invention claimed is:

1. A method of deploying a seabed seismic sensor array over an area of seabed to be investigated, the method comprising:

lowering to the seabed a deployment package comprising:
a frame;
a connection hub mounted to the frame;
an inputoutput riser cable having one free end and one end connected to the connection hub; and a number of cartridges detachably mounted to the frame, each cartridge containing a plurality of sensor units joined together in a chain by connecting cables, and one end of each chain being connected to the input-output riser cable at the connection hub; and deploying the sensor units over the area of seabed, by:
 detaching the cartridge from the frame;
 sequentially moving the cartridge to a plurality of sensor operating positions in the area of seabed; and
 at each respective sensor operating position, ejecting a respective one of the sensor units from the cartridge;

wherein each sensor unit comprises:
 a housing enclosing a number of sensors;
 an internal cavity within the housing; and
 a connecting cable within the cavity;

wherein while the cartridge is being moved between sensor operating positions, the connecting cable moves out of the cavity of one of a last-deployed sensor unit and a next sensor unit to be deployed.

2. The method of claim 1, wherein the connecting cable within the cavity of each sensor unit is
 wound on a respective spool, and wherein while the cartridge is being moved between sensor operating positions, the connecting cable is paid out from the spool of the next sensor unit to be deployed.

3. The method of claim 2, wherein the spool of the next sensor unit to be deployed is driven in rotation to pay the connecting cable out of that sensor unit while the cartridge is being moved between sensor operating positions.

4. The method of claim 1, wherein the connecting cable within the cavity of each sensor unit:
 is flaked down within the cavity, and wherein while the cartridge is being moved between sensor operating positions, the connecting cable is pulled out of the cavity of one of the last-deployed sensor unit and the next sensor unit to be deployed.

5. The method of claim 1, wherein respective formations on two adjacent sensor units within a cartridge are co-operable to define a cavity adapted to enclose the connecting cable joining the two adjacent sensor units.

6. The method of claim 1, wherein the connecting cables are fiber optic cables.

7. A deployment package for deploying a seabed seismic sensor array, the deployment package comprising:
 a frame adapted to be lowered to a seabed location;
 a connection hub mounted to the frame;
 an input/output riser cable having one free end and one end connected to the connection hub; and
 a number of cartridges detachably mounted to the frame, each cartridge containing a plurality of sensor units mounted for sequential ejection from the cartridge, wherein each sensor unit comprises:
  a housing enclosing a number of sensors;
  an internal cavity within the housing, and
  a connecting cable within the cavity;
 wherein the sensor units are joined together in a chain by the connecting cables, and one end of each chain is connected to the input/output riser cable at the connection hub.

8. The deployment package of claim 7, wherein the connecting cable is wound on a spool.

9. The deployment package of claim 7, wherein the connecting cable is flaked down in the cavity, so that by pulling an end of the connecting cable, the connecting cable may be drawn out of the cavity.

10. The deployment package of claim 7, wherein respective formations on two adjacent sensor units within a cartridge are co-operable to define a cavity adapted to enclose the connecting cable joining the two adjacent sensor units.

11. The deployment package of claim 7, wherein the connecting cables are fiber optic cables.

12. The deployment package of claim 7, wherein the cartridge includes an ejection tool for sequentially engaging the sensor units and sequentially removing the sensor units from the cartridge.

13. The deployment package of claim 7, wherein the cartridge is configured to be mounted to a submarine vehicle.

14. A sensor unit for a deployment package used in deploying a seabed seismic sensor array, the sensor unit comprising:
 a housing enclosing a number of seismic sensors;
 a cavity within the housing for removably receiving a length of connecting cable;
 a first connector that connects a first end of the cable to the sensors; and
 a second connector that connects the first end of the cable to a second end of a connecting cable of another sensor unit.

15. The sensor unit of claim 14, wherein the connecting cable is wound on a spool mounted within the cavity.

16. The sensor unit of claim 15, wherein the spool is provided with a driving mechanism engagable from outside the housing to rotate the spool.

17. The sensor unit of claim 14, wherein the connecting cable is received in the cavity as a coil, or flaked down in a serpentine or figure-8 configuration, and is configured to be drawn out of the cavity by tension applied to the second end of the cable.

18. A cartridge for a deployment package used in deploying a seabed seismic sensor array, the cartridge adapted to be releasably mounted to the deployment package, the cartridge configured to contain a plurality of seismic sensor units according to claim 14 mounted for sequential ejection from the cartridge, the cartridge comprising an urging mechanism to move the seismic sensor units so as to sequentially present the sensor units at an ejection position in the cartridge.

19. The cartridge of claim 18, further comprising an ejection tool mounted to the cartridge and co-operable with a sensor unit at the ejection position to eject the sensor unit from the cartridge.

20. A cartridge for a deployment package used in deploying a seabed seismic sensor array, the cartridge adapted to be releasably mounted to the deployment package, the cartridge configured to contain a plurality of seismic sensor units according to claim 14 mounted for sequential ejection from the cartridge, the cartridge comprising a mechanism that holds the plurality of sensor units in fixed positions within the cartridge, each sensor unit being ejectable from the cartridge from its fixed position.

21. The cartridge of claim 20, further comprising an ejection tool mounted for movement relative to the cartridge and sequentially co-operable with the sensor units to eject the sensor units from the cartridge.

* * * * *